United States Patent [19]

Tomelleri

[11] Patent Number: 4,891,889
[45] Date of Patent: Jan. 9, 1990

[54] APPARATUS FOR MEASURE AND/OR CHECK THE POSITION AND ORIENTATION OF CHARACTERISTIC SPOTS OR AREAS IN STRUCTURES, PARTICULARLY IN MOTOR-VEHICLE BODIES

[75] Inventor: Raffaele Tomelleri, Verona, Italy

[73] Assignee: Garda Impianti S.R.L., Verona, Italy

[21] Appl. No.: 189,227

[22] Filed: May 2, 1988

[30] Foreign Application Priority Data

May 5, 1987 [IT] Italy ............................ 84930 A/87

[51] Int. Cl.⁴ ........................... G01B 3/14; G01B 5/24
[52] U.S. Cl. .................................... 33/503; 33/608; 33/504; 33/558; 414/917
[58] Field of Search ............ 33/608, 503, 504, 553, 33/554, 1 MP, 1 PT, 555, 556, 558, 561; 901/4, 10, 15, 30, 44; 414/917

[56] References Cited

U.S. PATENT DOCUMENTS

| | | | |
|---|---|---|---|
| 2,818,494 | 12/1957 | Bernard et al. | 901/15 |
| 3,209,460 | 10/1965 | Eisele | 33/556 |
| 3,531,868 | 10/1970 | Stevenson | 33/503 |
| 3,944,798 | 3/1976 | Eaton | 33/504 |
| 4,258,474 | 3/1981 | DuMez | 33/503 |
| 4,384,407 | 5/1983 | Miyamoto | 33/503 |
| 4,477,973 | 10/1984 | Davies | 33/1 PT |
| 4,522,555 | 6/1985 | Inoue et al. | 414/917 |
| 4,523,384 | 6/1985 | Giacomini | 33/608 |
| 4,703,443 | 10/1987 | Moriyasu | 33/503 |
| 4,766,674 | 8/1988 | Zanier et al. | 33/503 |

FOREIGN PATENT DOCUMENTS

| | | | |
|---|---|---|---|
| 3310345 | 9/1984 | Fed. Rep. of Germany | 33/1 MP |
| 0184414 | 8/1986 | Japan | 33/503 |
| 1391328 | 4/1975 | United Kingdom | 33/558 |

Primary Examiner—William A. Cuchlinski, Jr.
Assistant Examiner—Thomas B. Will
Attorney, Agent, or Firm—Darby & Darby

[57] ABSTRACT

An apparatus 1 to measure and/or check the spatial position and angular orientation of characteristic spots or areas 3 in mechanical structures or members, particularly in motor-vehicle structural components such as bodies or wheels. The apparatus substantially comprises an articulated arm 4 provided with a number of pivot points 5 and carrying, at a free end thereof, a tracer point 10 adapted to be positioned close to the characteristic spots or areas 3 of the structure to be measured or checked. Located at the pivot points 5 of the articulated arm 4 are displacement transducers 16 which send electrical signals to a computer depending upon a variation in the configuration taken by the pivot points 5 as compared with corresponding reference configurations. The computer instantaneously give the spatial coordinates of each characteristic spot or area 3 of structure 2 that are individually contacted by the tracer point 10 and, when necessary, compares them with corresponding reference coordinates to ascertain possible differences due to construciton faults or damages in structure 2.

9 Claims, 5 Drawing Sheets

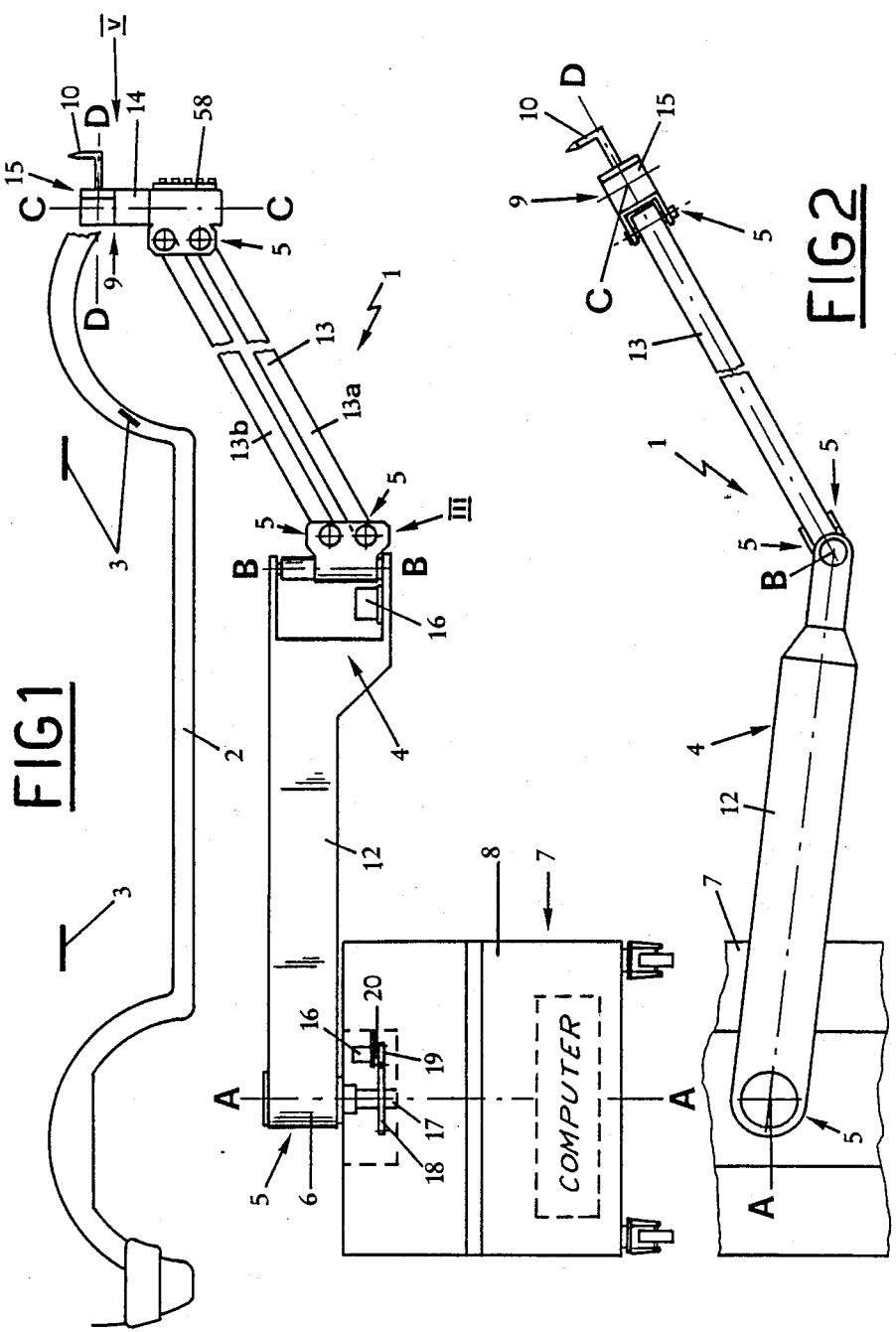

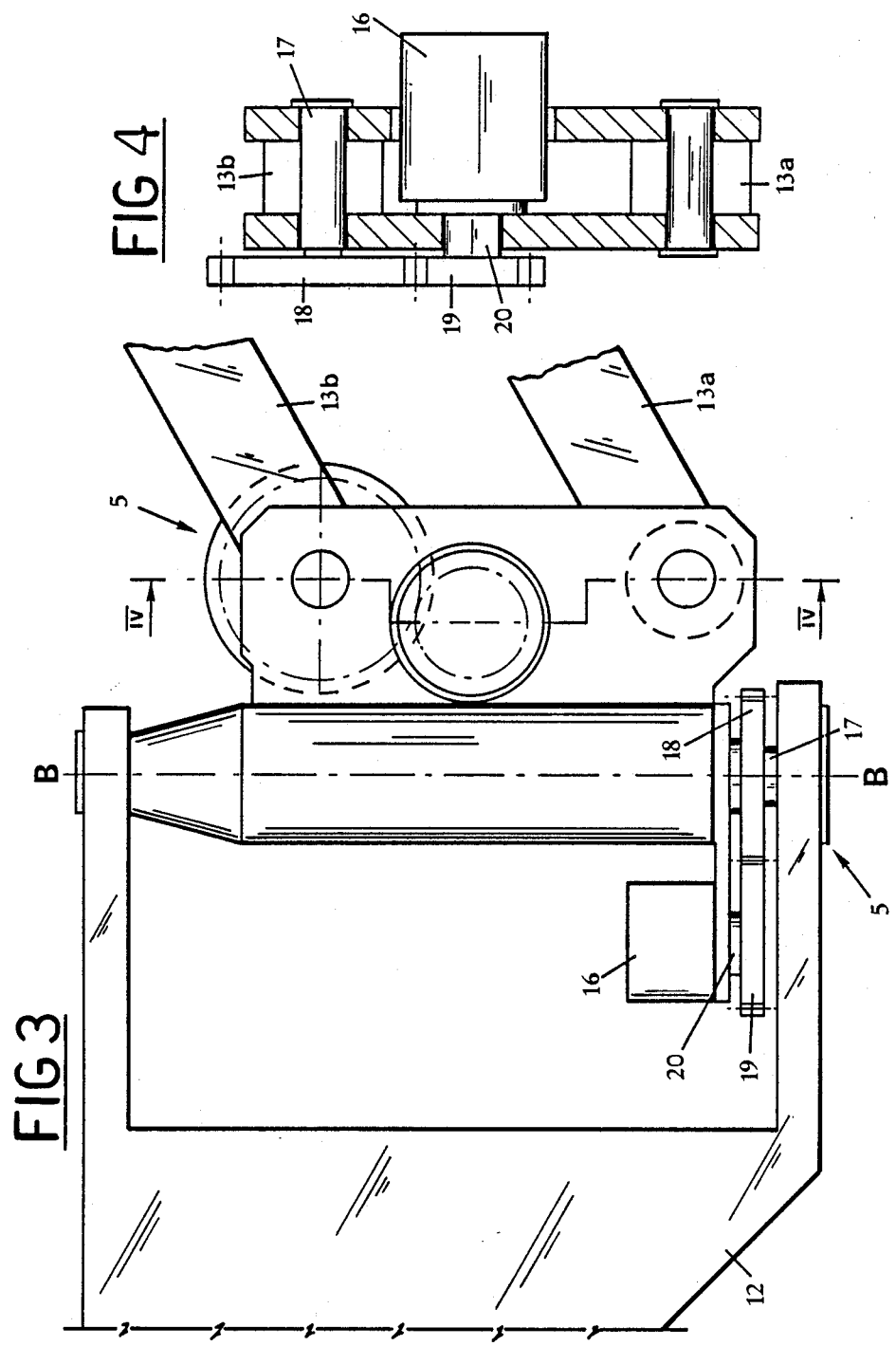

APPARATUS FOR MEASURE AND/OR CHECK THE POSITION AND ORIENTATION OF CHARACTERISTIC SPOTS OR AREAS IN STRUCTURES, PARTICULARLY IN MOTOR-VEHICLE BODIES

Field of the Invention

The present invention relates to an apparatus to measure and/or check the spatial position and angular orientation of characteristic spots or areas in mechanical structures or members.

Although the apparatus may be used in any technological field where measures or controls for structural configurations are involved, it is particularly and excellently applied to the motor-vehicle field. Referring to this particular field the apparatus is designed to carry out measures or controls to damaged motor-vehicle bodies as a result of an accident, as well as to other component parts of the motor-vehicle in order to find out and correct possible deformations or to check and set the trim of the wheels, etc.

BACKGROUND OF THE INVENTION

At the present time, in accordance with the known art, necessary measures and controls are accomplished by means of empirical methods using traditional measuring instruments such as scales, goniometers and the like. Therefore the valuations and data thus obtained greatly depend on the capability of the operator and accuracy of measurements.

It is known that in the particular field of motor-vehicles the control of the characteristic spots and areas in motor-vehicle bodies is carried out by the use of suitable reforming and straightening apparatus. Such controls, although sufficiently precise, do however require hard measurings and rather long execution times. It is also to be noted that with the use of traditional reforming and straightening apparatus it is not possible to define the spatial configuration but only to check the location of the characteristic spots in the structure compared with already known reference positions.

As to the particular case concerning the control of the trim of the wheels, it is presently carried out, as is known, by the use of specific optical-mechanical apparatus quite differentiated from the above mentioned systems for the control of the bodies.

SUMMARY OF THE INVENTION

The main object of the present invention is to overcome the drawbacks of known measuring and control methods and equipments by providing an apparatus capable of carrying out the measurement or control of the position and orientation of characteristic spots or areas in structures or mechanical members accurately and in a short period of time.

A particular object of the invention is also to provide an apparatus by which it is possible to carry out the measurement or control of characteristic spots or areas in the motor-vehicle bodies or other members thereof in order to define the spatial configuration of the same so as to ascertain how much these values may differ as compared with reference values.

The foregoing and still further objects are attained by the apparatus of the invention the main features of which are set forth in the appended claims.

BRIEF DESCRIPTION OF THE DRAWINGS

Further features and advantages of the present invention will become more apparent from the detailed description of a preferred embodiment and use of the apparatus in question, given hereinafter by way of non-limiting example with reference to the accompanying drawings, in which: - FIG. 1 is a diagrammatic side view of the apparatus of the invention used to measure or check a motor-vehicle body; - FIG. 2 is a top view of the apparatus shown in FIG. 1; - FIG. 3 is an enlarged view of the detail designated as II in FIG. 1; - FIG. 4 is a sectional view taken along line IV—IV of FIG. 3.

DESCRIPTION OF THE PREFERRED EMBODIMENT

Figure 5:
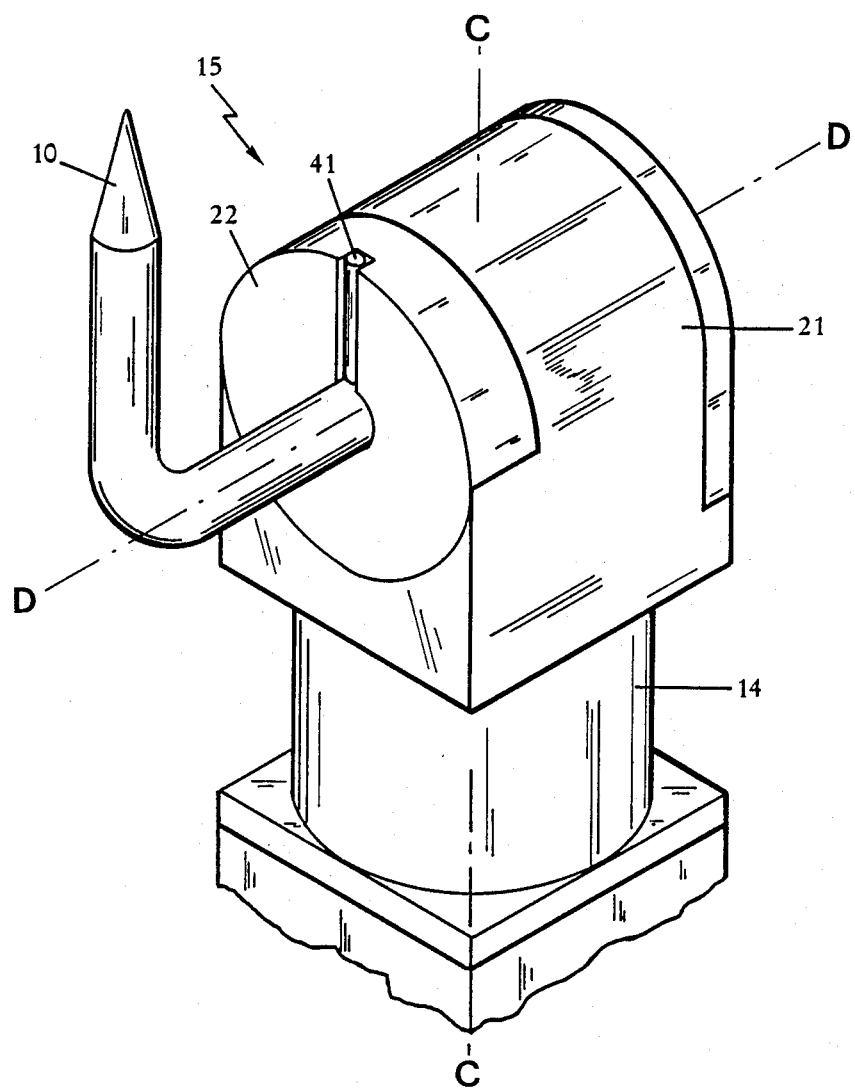
- FIG. 5 is an isometric diagrammatic view of the detail designated as V in FIG. 1, showing a swinging head.

With reference to the accompanying drawings the apparatus of the invention has been globally identified by reference numeral 1 while 2 denotes a mechanical structure (in this case the body of a motor-vehicle) having characteristic spots or areas 3 the spatial position and angular orientation of which has to be measured or checked by the apparatus 1.

Said apparatus 1 is comprised of an articulated arm provided with a number of pivot points 5 and fastened, at one end 6 thereof, to a supporting member 7, consisting of a carriage provided with a space 8 within which a computer is accommodated. A second free end 9 of the arm 4 is provided with a tracer point 10 consisting of a cylindrical sharpened L-shaped rod (obviously any other shape can be adopted), which can be located close to each individual spot or area 3 of structure 2. A connecting adaptor 11 (seen in FIG. 7) can be interposed between the tracer point 10 and the area or spot 3, as more clearly shown in the following.

The articulated arm 4 consists of one element 12 rotatably pivoted to the carriage 7 at its end 6 and designed to rotate about a first axis A, and a second element 13 pivoted to the end of the first element 12 and designed to rotate about a second axis B parallel to axis A. The second element 13 is in the form of a linkage parallelogram and it comprises a pair of parallel rods 13a and 13b capable of carrying out oscillations in a plane parallel to axis B. Disposed at the end of the second element 13 is a supporting element 14 with which a swinging head 15 (particularly seen in FIGS. 5 and 6) carrying the tracer point 10 is associated, which head can perform rotations about a third axis C, parallel to axes A and B, and a fourth axis D perpendicular to the former, respectively.

Located at the pivot points 5 are displacement transducers 16 (FIGS. 1, 3 and 4) each of them being adapted to generate an electrical signal depending upon a variation of the configuration taken by the respective pivot point 5 as compared with a reference configuration. Said electrical signal is sent to the computer which instantaneously gives the spatial coordinates of each spot or area 3 contacted by the tracer point 10. If in addition to the measure one wishes to carry out the control of the position of spots or areas 3, the computer will compare the coordinates measured with corresponding spatial coordinates supplied as reference, for example by the motor-vehicle constructing firm.

Each pivot point 5 of the arm 4 comprises a pivot 17 carrying a first sprocket wheel 18 meshing with a second sprocket wheel 19 provided on a shaft 20 operating the movable member of the transducer 16 mounted thereto.

The swinging head 15 consists of a first rotating body 21 adapted to rotate about the third axis C and a second rotating body 22, carried by body 21 and adapted to rotate about the fourth axis D and in turn supporting the tracer point 10.

Figure 6:
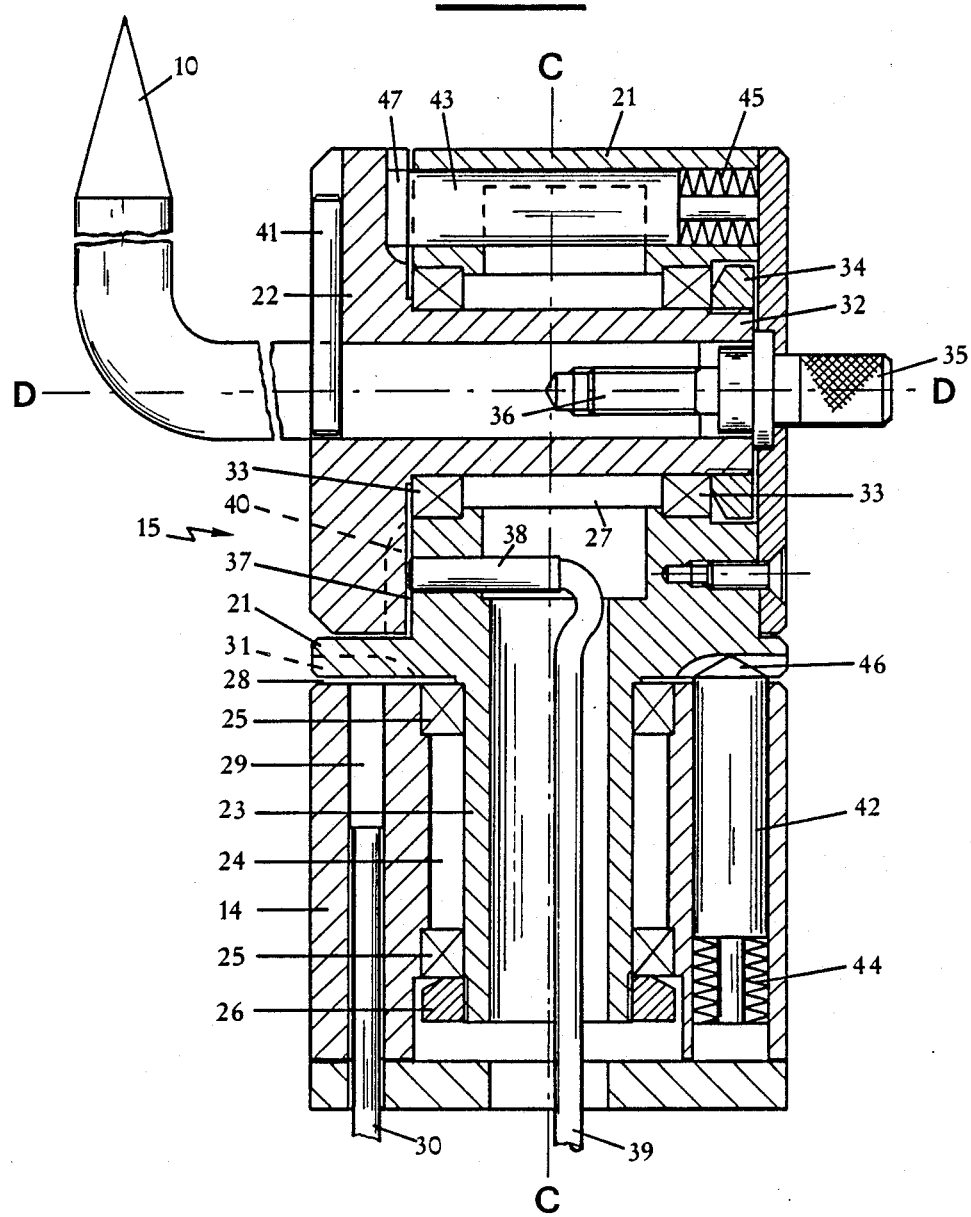
- FIG. 6 is a sectional view of the swinging head shown in FIG. 5, taken according to a plane of symmetry.

As can be seen in FIGS. 5 and 6, a peg 41 extends in a slot in the second rotating body 22 to the L-shaped rod of the tracer point 10.

The first body 21 is provided with a cylindrical stem 23 coaxial with axis C and rotatably fitted into a corresponding housing 24 formed in the supporting element 14 where bearings 25 and a threaded locking collar 26 are provided. The body 21 further has a cylindrical hole 27 coaxial with axis D and adapted to receive the second body 22.

Located within the supporting element 14, in the vicinity of the area 28 where the relative sliding between the body 21 and the supporting element 14 occurs, is a proximity sensor 29 equipped with an electric cable 30 connected to the computer. In the body 21, close to the area 28, holes 31 are formed which are disposed circumferentially with respect to axis C and are designed to code positions. In this way each displacement (rotation) that the body 21 may undergo as compared with a reference position will be detected by sensor 29 which will send a suitable electrical signal to the computer.

The second body 22 is provided with a cylindrical shank 32 coaxial with axis D and rotatably fitted in the hole 27 where bearings 33 and a threaded locking collar 34 are provided. Formed in the shank 32 is a cylindrical hole adapted to receive the tracer point 10 (fastened by a dowel) the axial position of which (referred to axis D) can be established by means of a knob associated with a screw 36 which is introduced into the tracer point 10.

In the first body 21, close to the area 37 where the relative sliding between bodies 22 and 21 occurs, there is a proximity sensor 38 connected to the computer through an electric cable 39. In the second body 22, in the vicinity of the area 37, position coding holes 40 are formed and they are circumferentially disposed with respect to axis D. In this way each displacement (rotation) that the body 22 may undergo with respect to a reference position will be detected by sensor 38 which will send a suitable electrical signal to the computer.

In the embodiment shown in FIG. 6 gudgeon pins 42 and 43 are provided which are resisted by springs 44 and 45 and allow the bodies 21 and 22 to carry out rotations of discrete width. In fact they are provided with prismatic heads 46 and 47 coming in contact with holes 31 and 40 respectively.

It is to note that as far as measures or controls of not very complicated structures from a geometrical point of view are concerned, the use of the only articulated arm 4 in order to bring the tracer point 10 into contact with the interested spots or areas 3 could be sufficient. On the contrary the use of the swinging head 15 allows any spot to be reached even if it is hardly accessible and the involved structure has a very complicated geometrical configuration.

Furthermore the different movements the head 15 can accomplish are necessary for immediately displaying (on the computer monitor) the displacements of a spot or area 3 of the structure 2 during the deformation steps of the latter. In this connection it is pointed out that particularly during the straightening step of a motor-vehicle body for example, it is very advantageous to be able to immediately display the different displacements.

The use of a connecting adaptor 11 makes it possible to position the tracer point 10 on hardly accessible spots or areas 3 or on areas the control of which is not provided as well as to check the displacements of the spots themselves in the course of the body straightening steps.

Figure 7:
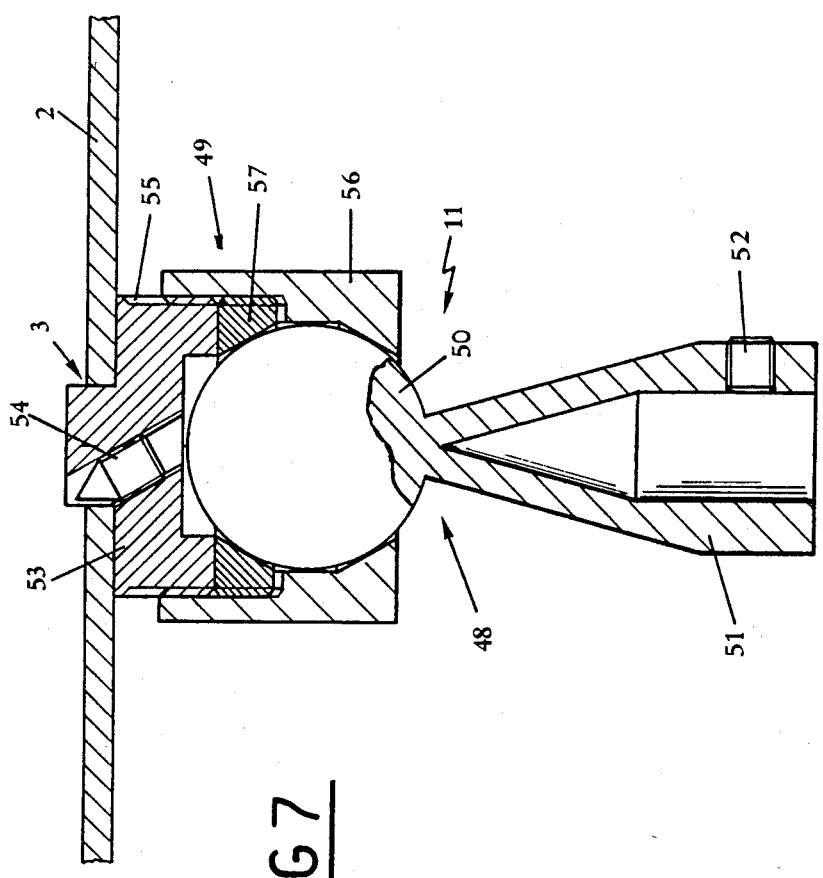
- FIG. 7 is a diagrammatic sectional view of the connecting adaptor being a part of the apparatus in question.

As shown in FIG. 7, said adaptor 11 consists of a movable member 48 provided with means adapted to connect it to the tracer point 10 and housed within a fixed member 49 equipped with means adapted to engage it with the spot or area 3 of structure 2.

In greater detail, the member 48 is formed with a ball-shaped body 50 and the connecting means to the tracer point 10 consists of a funnel-like body 51 adapted to receive the tracer point 10, which is fixed by a threaded dowel 52.

The fixed member 49 consists of a plug-shaped element 53, insertable in a hole made in the body 2 where it is fixed by means of a threaded dowel 54, the plug-shaped element being provided with an outer screw thread 55. A bush 56 internally provided with a threaded ring 57 is screwed on said thread 55 after positioning the ball-shaped body 50.

It is noted that the command to send the electrical signal to the computer when it is wished to carry out the measurement or control of the position is imparted by an operator actuating the arm 4 by means of a push-button panel 58 disposed at the end 9 of arm 4.

The push-button panel 58 can have a main push-button to be used to measure or check the position of individual spots 3, as well as a set of four additional push-buttons to be used when it is wished to measure or check angular orientations of particular part in structure 2.

The main push-button is actuated by the operator as soon as the tracer point 10 is in register with the spot or area 3 to be measured or checked. On the contrary, the measurement and control of the angular orientation is carried out by positioning the tracer point 10 at the four vertices of an imaginary square lying in a plane tangent to the area 3 to be inspected. The four push-buttons forming the additional set are then depressed individually and successively when the tracer point 10 is put at the vertices of the above mentioned imaginary square.

The measurement or control of the angular orientation can advantageously be used for example to set the trim of the wheels in a motor-vehicle as well as, of course, to inspect the different parts of a motor-vehicle body.

It is finally to be pointed out that if the use of a printer associated with the computer is provided, it is possible to immediately have written documents concerning the conditions of damaged motor-vehicles as a result of accidents, which documents are useful to prepare precise estimates for expenditure in case of repairs or for other purposes.

It is understood that the apparatus of the invention can take forms and configurations different from the one hereinbefore described without departing from the inventive idea characterizing it. In addition all of the details may be replaced by technically equivalent elements and the forms, sizes and materials used may be of any nature and magnitude in accordance with requirements.

What is claimed is:

1. An apparatus for measuring or checking a spatial position and an angular orientation of characteristic spots or areas in structures, comprising an articulated arm with a number of pivot areas and having one end secured to a supporting member and a second free end from which extends a tracer element to be individually positioned adjacent each of said characteristic spots or areas in said structure to be measured or checked, a displacement transducer located adjacent at least one of said pivot areas, said transducer generating an electrical signal in dependence upon a variation in configuration of said pivot areas of the arm as compared to a reference configuration, supply means responsive to said electrical signal for supplying spatial coordinates of said spatial position and angular orientation of each of said characteristic spots or areas which are contacted by the tracer element, said articulated arm including a first element rotatably pivoted to said supporting member at a first fixed end thereof and being rotatable about a first axis, a second element having an end pivotably connected to an end of said first element that is opposite the first fixed end, said second element capable of rotating about a second axis substantially parallel to said first axis, said second element being in the form of a linkage parallelogram and comprising a pair of parallel rods capable of carrying out oscillations in a plane substantially parallel to said second axis, a supporting element adapted to retain said tracer element at an end of said second element opposite that connecting the second element to the first element, and a swinging head carrying the tracer element on said support element and being capable of performing rotations about a third axis substantially parallel to the first and second axes and about a fourth axis substantially perpendicular to the first axis.

2. The apparatus as claimed in claim 1, wherein said swinging head comprises a first rotating body having a cylindrical stem coaxial with said third axis and a cylindrical hole coaxial with said fourth axis, said cylindrical stem being rotatably fitted in a corresponding housing formed in said supporting element so as to allow said first body to rotate about said third axis, said head further comprising a second rotating body carried by said first body and carrying said tracer element, the second body having a cylindrical shank rotatably fitted in said cylindrical hole so as to allow the second body to rotate about said fourth axis, said displacement transducers being arranged for sending the electrical signals to said supply means depending upon displacements which said first and second rotating bodies undergo respectively as compared with corresponding reference positions.

3. The apparatus as claimed in claim 1, wherein said supply means includes a computer, said free end of said articulated arm having a push-button panel electrically connected to said computer, said push-button panel being designed, through the intervention of an operator, to control the sending of an electrical signal to said computer when the tracer element is positioned close to said characteristic spot or area.

4. The apparatus as claimed in claim 1, wherein each of said pivot areas of the articulated arm comprises a pivot carrying a first sprocket wheel, the movable member of each displacement transducer being operated by a shaft carrying a second sprocket wheel meshing with the first sprocket wheel.

5. The apparatus as claimed in claim 2, wherein said displacement transducers include proximity sensors located respectively on said supporting element adjacent to an area where a relative sliding between said first body and supporting element occurs and on said first body adjacent an area where a relative sliding between said second body and first body occurs.

6. The apparatus as claimed in claim 1, wherein a connecting adaptor is interposed between the tracer element and said characteristic spot or area.

7. An apparatus for measuring or checking a spatial position and an angular orientation of characteristic spots or areas in structures, comprising an articulated arm with a number of pivot areas and having a first end secured to a supporting member and a second free end from which extends a tracer element to be individually positioned adjacent each of said characteristic spots or areas in said structure to be measured or checked, a displacement transducer located adjacent at least one of said pivot areas, said transducer generating an electrical signal independence upon a variation in configuration of said pivot areas of the arm as compared to a reference configuration, supply means responsive to said electrical signal for supplying spatial coordinates of said spatial position and said angular orientation of each of said characteristic spots or areas which are contacted by the tracer element, said articulated arm including a first element rotatably pivoted to said supporting member at a first fixed end thereof and being rotatable about a first axis, a second element having an end pivotably connected to an end of said first element that is opposite the first fixed end, said second element being rotatable about a second axis substantially parallel to said first axis, said second element being in the form of a linkage parallelogram and comprising a pair of parallel rods capable of carrying out oscillations in a plane substantially parallel to said second axis, a supporting element adapted to retain said tracer element at an end of said second element opposite that connecting the second element to the first element, and a connecting adaptor being interposed between the tracer element and said characteristic spot or area, said connecting adaptor being comprised of a movable member having means connectable to the tracer element and housed within a fixed member having means for engaging with said structures to be checked at said characteristic spots or areas.

8. The apparatus as claimed in claim 7, wherein said movable member includes a ball-shaped body, said connecting means being comprised of a shaped body extending radially of the ball-shaped body and adapted to receive the tracer element.

9. The apparatus as claimed in claim 7, wherein said supporting member to which the first end of said articulated arm is secured includes a carriage comprising a space designed to house said supply means.

* * * * *